Jan. 9, 1923.
E. CHRISTENSEN.
HAYSTACKER.
FILED JAN. 9, 1922.
1,441,830.
2 SHEETS—SHEET 1.
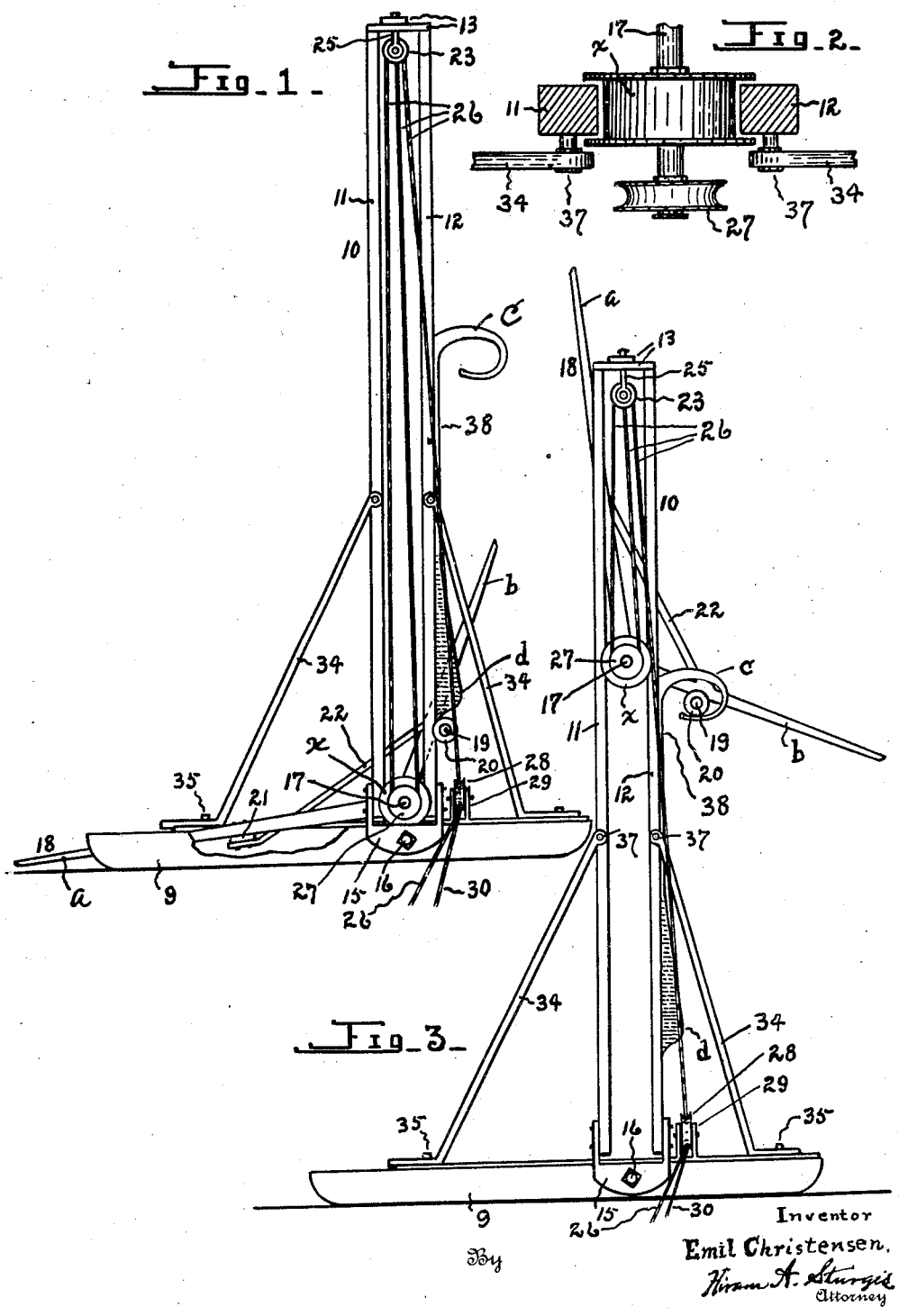
Inventor
Emil Christensen.
By Hiram A. Sturgis
Attorney

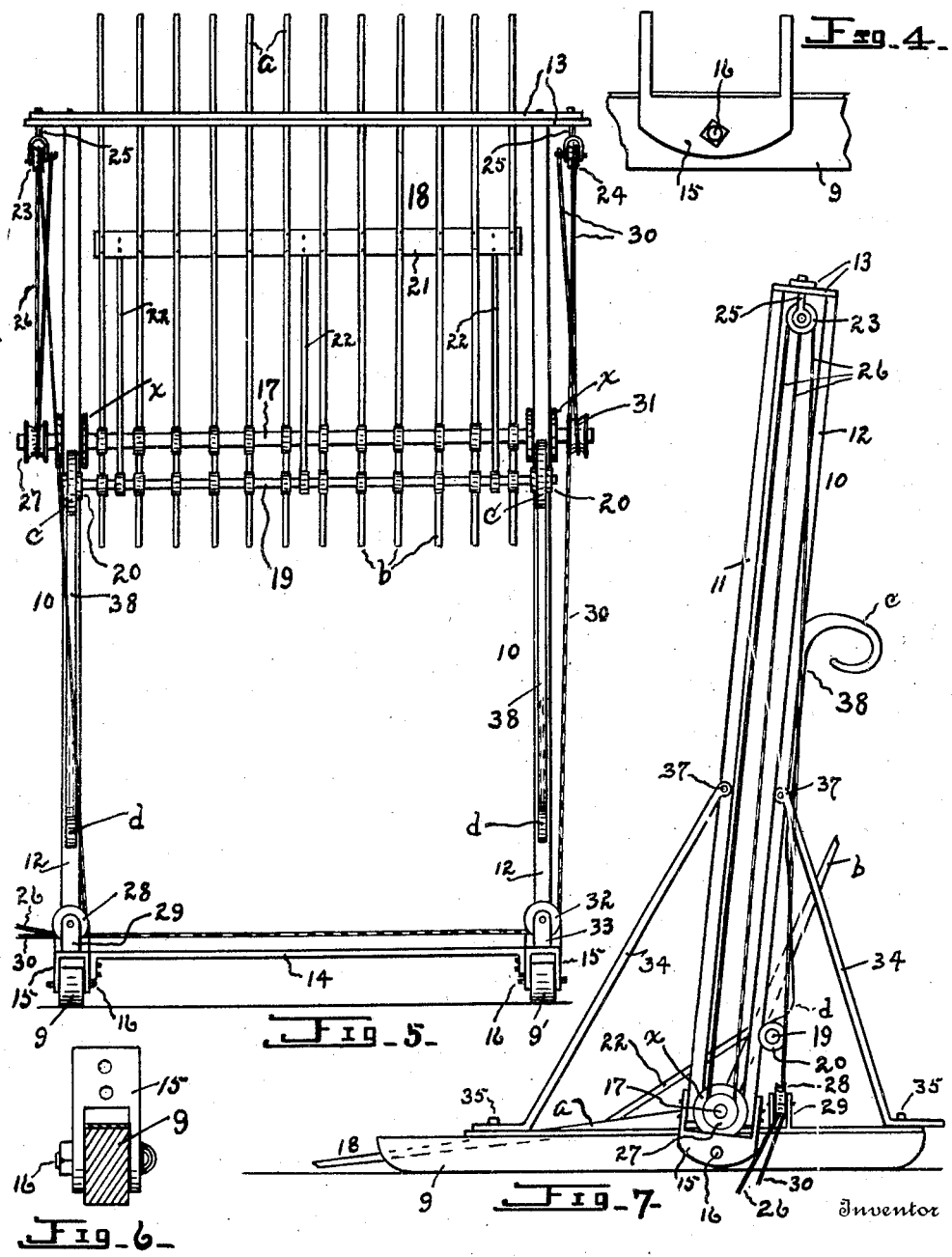

Patented Jan. 9, 1923.

1,441,830

UNITED STATES PATENT OFFICE.

EMIL CHRISTENSEN, OF HOOPER, NEBRASKA.

HAYSTACKER.

Application filed January 9, 1922. Serial No. 527,952.

*To all whom it may concern:*

Be it known that I, EMIL CHRISTENSEN, a citizen of the United States, residing at Hooper, in the county of Dodge and State of Nebraska, have invented certain new and useful Improvements in Haystackers, of which the following is a specification.

This invention relates to an improved hay stacker and has for its object, broadly, to provide a stacker consisting of few and simple parts so that it may be manufactured economically, will be effective in operation for elevating hay or similar material, will be convenient in use, and durable in wear. One of the specific objects is to provide a control for the swinging movements of the fork both when leaving the ground and for discharging its load. Another specific object is to provide means for inclining the upright supporting-frame and maintaining it at a desired degree of inclination. Other objects will be mentioned hereinafter.

With the foregoing objects in view the invention presents a novel construction, combination and arrangement of parts, as described and claimed, and as illustrated in the accompanying drawing, wherein,—

Fig. 1 is a view in side elevation of a hay stacker embodying my invention, the fork being at its lowermost position, a part of one of the runners being broken away. Fig. 2 is an enlarged view showing the mounting of the braces on the standards of the upright frame, the standards being in section. Fig. 3 is a similar view to that shown in Fig. 1, the fork being elevated. Fig. 4 is an enlarged detail showing a side view of a yoke. Fig. 5 is a rear view of the stacker, the braces being omitted. Fig. 6 is a detail showing an end view of the yoke. Fig. 7 is a similar view to that shown in Fig. 1, the frame being adjusted to an inclined position. Fig. 8 is a plan view of a runner.

Referring now to the drawing for a more particular description, the stacker consists, in part, of a pair of runners 9 and 9′, upon which is mounted, to permit forward and rearward rocking movements, an upright frame, said frame consisting of a pair of connected side frames 10, each side frame consisting of a pair of standards 11 and 12, said standards 11 and 12 of each pair being maintained approximately parallel by means of suitable cross-strips 13 and 14, the latter being secured to the runners and the strips 13 being secured to the upper ends of the standards, yokes 15 being employed and pivotally mounted, as indicated at 16, to the runners, the arms of the yokes being secured to the standards.

As thus described each pair of standards of a side frame will provide bearings for a wheel $x$ adapted to be moved freely upwardly and downwardly therebetween, said wheels $x$ being journalled on a horizontal shaft 17. Secured by any suitable means to the shaft 17 are the teeth $a$ of a fork 18, said teeth being disposed approximately parallel as compared with each other; and secured to the shaft 17 are the teeth $b$ of said fork, said teeth $b$ being disposed approximately parallel with reference to each other, and disposed at an obtuse angle to the teeth $a$ of the fork.

Numeral 19 indicates a shaft which is disposed parallel with the shaft 17, upon said shaft 19 being secured, by any suitable means, the teeth $b$ of the hay fork, and upon each end of said shaft 19 being journalled a wheel 20. Numeral 21 indicates a cross-plate which is secured to the teeth $a$ of the fork as a support for said teeth for resisting stresses directed thereto by hay when thrown thereon, stay-rods or bars 22 preferably being employed and secured at its respective ends to said plate and to the shaft 19.

As thus described, the fork will resist stresses to great advantage, the teeth $a$, while mounted upon the shaft 17, being supported between their ends by the cross-plate 21, and the teeth $b$ being mounted on the shaft 17 and supported between their ends by the shaft 19.

In order that the fork may be elevated and may be lowered, a pair of pulleys, indicated respectively at 23 and 24 are employed, these being mounted in hangers 25 which are secured to the cross-strips 13, outwardly of the standards, as best shown in Fig. 5. A cable 26 is secured to a hanger near the pulley 23 and engages a pulley 27 which is journalled on the shaft 17, and from this pulley said cable extends to and engages the pulley 23 and from the pulley 23 said cable extends to and engages a pulley 28 which is mounted for rotation on a bracket 29, attached to the top of the runner 9.

Numeral 30 indicates a cable or strand which is secured to a hanger near the pulley 24 and extends therefrom for engaging a pulley 31 which is journalled on the shaft 17, and from this pulley said cable extends to and engages the pulley 24, and from said pulley 24 this cable extends to and engages a pulley 32 which is mounted for rotation on a bracket 33, opposite to the bracket 29, and from the pulley 32 said cable 30 extends to and engages the pulley 28.

It will be seen by referring to Fig. 7, that the upright frame, including the standards, may be swung to, approximately, a horizontal position for convenience when moving the stacker from one field to another, the brace-bars 34 being detached from the runners; or the frame may be swung to an inclined position, the brace-bars 34 being adjustable for that purpose, the keepers 35 engaging in apertures 36 provided for the runners for removably securing the bars 34 to said runners, said brace-bars being pivotally mounted upon the standards, as indicated at 37, this adjustable feature being of great advantage for discharging hay to the middle of a stack, or for loading hay upon a wagon, or for use during high winds. By use of the braces 34 and their adjustable mountings, together with the pivotal mounting of the yokes, the standards may be maintained in, approximately, a vertical position, or at any suitable inclination.

The standards 12, for a part of their length, are provided with trackways 38, each having an outwardly and downwardly curved part $c$ at its upper end and having a convexed projection $d$ at its lower end, said part $c$ operating as a stop-member.

In operation, the parts being disposed as shown in Figs. 1 or 7, hay or other like material first being placed on the hay fork, the cables 26 and 30 are moved outwardly from the stacker, by any suitable means, thereby causing the fork to move upwardly, each wheel $x$ moving between a standard 11 and 12, and each wheel 20 moving on its track 38, the flanges of the wheels $x$ maintaining them in their normal position between said standards, and the flanges of the wheels 20 causing them to remain in engagement with the trackways 38, said wheels $x$ and 20 being of such proportion that they will move without appreciable friction. It will be understood that during the upward movement of the hay fork the wheels 20 will engage the curved parts $c$ of the trackways 38. Since each part $c$ is of hook-form and has a downward curvature it will control the movement of the wheel 20 engaged thereby, and therefore the swinging movement of the fork will be effected when the wheels 20 engage the parts $c$ of the tracks. It will be noted that the distance between the shafts 17 and 19 is uniform at all times, and when the fork is elevated to such a distance that the wheels 20 engage the parts $c$, said wheels will move outwardly and downwardly while the wheels $x$ are completing their upward movements between the standards, the result being that the fork will swing to the position shown in Figs. 3 and 4, the teeth $a$ moving against a cross-strip 13 with considerable force, this force being sufficient to cause the hay to slide from the teeth $b$.

It is obviously an advantage to dispose the free ends of the teeth $a$ upon the ground when the hay is to be deposited thereon, and the present construction provides for this feature. Also it is an advantage, if possible, to cause the teeth $a$ to swing upwardly as soon as their free ends leave the ground, so that the load will be elevated and that no part of the load will fall from the fork, and this feature is provided by the present construction, the operation being that when the fork begins its upward movement, the wheels 20 will at once engage the curved projections $d$ which causes the outer ends of the teeth $a$ to move upwardly, for the purpose described.

By referring to Fig. 2 it will be seen that the pivotal mounting 37 for the braces 34 is of such form that they will not prevent a free movement of the wheels $x$. While I have described construction in detail I do not wish to be understood as limiting myself in this respect, and changes in form, size, proportion and minor details may be made as found to be of advantage, said changes to be determined by the scope of the invention as claimed.

I claim as my invention:

1. A hay stacker comprising a pair of connected, adjacently disposed runners, each provided with a pair of upright, connected, adjacently disposed standards, curved projections on one of the standards of each pair, a fork provided with a pair of shafts and disposed between the pairs of standards, roller-members journalled on the shafts for engaging the standards, curved stop-members on one of the standards of each pair, said fork being movable upwardly to carry a load, the rollers of one of the shafts engaging the curved projections for swinging the fork when commencing its upward movement and thereafter engaging the curved stop-members for swinging the fork to discharging position.

2. In a hay stacker, a base, an upright frame including connected standards arranged in pairs and mounted on the base, one of the standards of each pair being provided with a trackway having a curved stop-member, a fork comprising a shaft and second shaft, teeth disposed transversely of and connected with the shafts, roller-members journalled on the shafts, said fork being movable between the pairs of standards for elevating a load, the roller-members of the first named shaft engaging between the standards of each pair, the roller-members of the second shaft engaging said trackways and adapted to engage the curved stop-members for swinging the fork to discharging position.

3. In a hay stacker, a base, a frame normally vertical having a pivotal mounting on the base and including connected standards arranged in pairs, one of the standards of each pair being provided with a curved stop-member, means to adjust said frame to an inclined position relative to the base, a fork comprising a shaft and second shaft, teeth disposed transversely of and connected with the shafts, roller-members journalled on the shafts, said fork being movable between the pairs of standards for elevating a load, the roller-members of the second shaft moving on one of the standards of each pair for engaging the curved stop-members to swing the fork to discharging position.

4. In a hay stacker, a base, an upright frame including connected standards arranged in pairs and mounted on the base, one of the standards of each pair being provided with a curved projection and a stop-member, a fork including a shaft and a second shaft, roller-members journalled on the shafts, said fork being movable upwardly between the pairs of standards for moving a load, the roller-members of the first named shaft engaging between the standards of each pair, the roller-members of the second shaft engaging the curved projections for swinging a part of the fork upwardly when commencing its upward movement and thereafter engaging the stop-members for swinging the fork to discharging position.

5. In a hay stacker, a base, a frame normally vertical having a pivotal mounting on the base and including connected standards arranged in pairs, one of the standards of each pair being provided with a curved projection and a stop-member, means to adjust said frame to an inclined position relative to the base, a fork including a shaft and a second shaft, roller-members journalled on the shafts, said fork being movable upwardly between the pairs of standards for moving a load, the roller-members of the first named shaft engaging between the standards of each pair, the roller-members of the second shaft engaging the curved projections for swinging a part of the fork upwardly when commencing its upward movement and thereafter engaging the stop-members for swinging the fork to a discharging position.

6. In a hay-stacker, a pair of connected, horizontal runners, a pair of yokes each being pivotally mounted on a runner, normally vertical standards arranged in pairs and secured to the yokes, one of the standards of each pair being provided with a stop-member, a fork including a shaft and a second shaft, roller-members journalled on the shafts, said fork being movable upwardly for moving a load, the roller-members of the second shaft moving into engaging position with the stop members for swinging the fork to discharging position, and a plurality of braces connected with the standards and runners adapted to be adjusted for maintaining the standards inclinedly relative to the runners.

In testimony whereof, I have affixed my signature in presence of two witnesses.

EMIL CHRISTENSEN.

Witnesses:
 HIRAM A. STURGES,
 L. L. STEPHENS.